United States Patent [19]

Huisman

[11] 3,939,067
[45] Feb. 17, 1976

[54] METHOD AND APPARATUS FOR TREATING SEWAGE

[75] Inventor: Peter H. Huisman, Pretoria, South Africa

[73] Assignee: Gypsum Industries Limited, Transvaal, South Africa

[22] Filed: Oct. 30, 1973

[21] Appl. No.: 411,158

[30] Foreign Application Priority Data
Mar. 21, 1973   South Africa.................... 73/1972

[52] U.S. Cl..................... 210/7; 210/15; 210/195 S; 210/197; 210/220
[51] Int. Cl.² ........................................... C02C 1/08
[58] Field of Search ..................... 210/4–7, 15, 210/197, 256, 261, 512 R, 14, 65, 74, 194–196, 304, 533–538, 73, 519, 220

[56] References Cited
UNITED STATES PATENTS

| | | | |
|---|---|---|---|
| 1,260,135 | 3/1918 | Blomfield | 210/512 R |
| 1,815,159 | 7/1931 | Nordell | 210/512 R |
| 3,220,706 | 11/1965 | Valdespino | 210/5 X |
| 3,470,092 | 9/1969 | Bernard | 210/15 |
| 3,487,017 | 12/1969 | Thorn et al. | 210/197 X |
| 3,517,814 | 6/1970 | Minegishi | 210/197 |
| 3,627,136 | 12/1971 | Mackrle et al. | 210/519 X |
| 3,706,380 | 12/1972 | LeQuinquis | 210/512 R X |
| 3,815,750 | 6/1974 | Mackrle et al. | 210/261 X |

FOREIGN PATENTS OR APPLICATIONS 1,202,208   1/1960   France ............................. 210/73

Primary Examiner—Charles N. Hart
Assistant Examiner—Robert H. Spitzer
Attorney, Agent, or Firm—Berman, Aisenberg & Platt

[57] ABSTRACT

A method and means for treating sewage using the activated sludge process. Sewage in a circular aeration chamber is given a spiral motion about the chamber centre and this motion is used to cause liquid-borne sludge to flow from the chamber along a canal around the chamber. Part of the sludge is returned from the canal to the chamber under the influence of gravity for recirculation.

12 Claims, 3 Drawing Figures

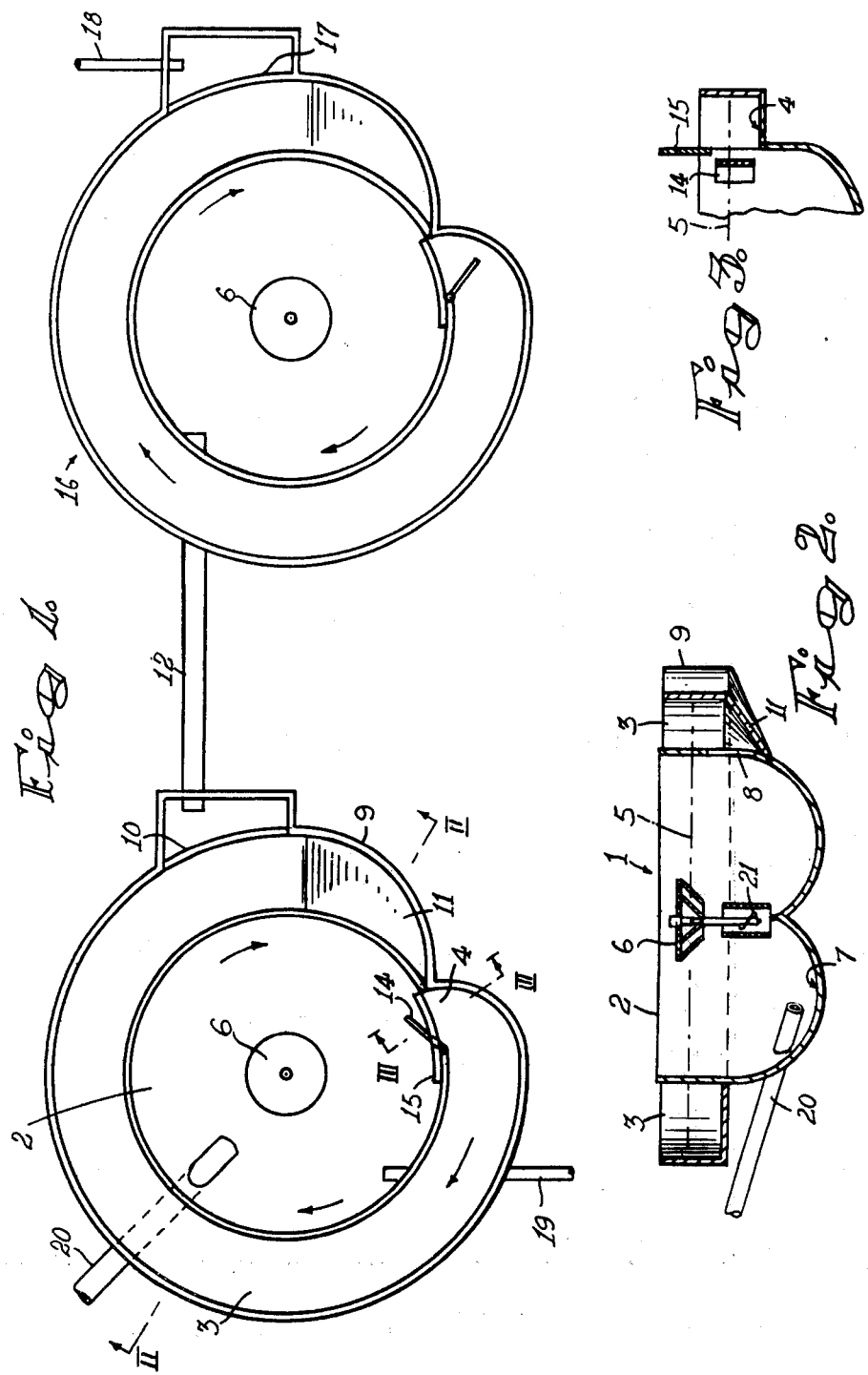

METHOD AND APPARATUS FOR TREATING SEWAGE

This invention relates to treatment of sewage using the activated sludge process and more particularly to the aeration of sewage and sludge in this process.

Aeration of liquid-borne sludge is usually effected in aeration tanks from where the sludge is passed to a sludge settling installation. Sludge is returned from the latter to the aeration tank to enhance activation and digestion of incoming sewage.

It is an object of the present invention to provide a method of and means for enhancing digestion of sludge in the aeration stage. A further object of the invention is to allow for denitrification of activated sludge in the aeration stage.

According to this invention there is provided a method of treating sewage using the activated sludge process comprising imparting to sewage introduced into a circular aeration chamber a spiral motion about the chamber centre, using the motion imparted to the sewage to cause liquid-borne sludge from the chamber to flow along a canal around the chamber and returning at least part of the liquid-borne sludge in the canal back into the aeration chamber under the influence of gravity for recirculation.

The invention also provides apparatus suitable for use in the treatment of sewage using the activated sludge process comprising a tank having a central aeration chamber and a canal around it, an overflow weir from the chamber into the canal, a deflecting wall in the canal co-operating with an underflow weir from the canal to the chamber and an outlet from the canal adjacent the deflecting wall upstream thereof.

Further features of the invention provide for the overflow and underflow weirs to be located adjacent one another, for the floor of the canal to slope downwardly from the deflecting wall to the underflow weir, for the deflecting wall to be displaced progressively towards the aeration chamber centre over the length of the canal having the inclined bottom and for the aeration chamber to have a base in the form of an endless channel of arcuate cross-section.

Still further features of the invention provide for the outlet to be in the form of an overflow weir preferably of adjustable height, for the apparatus to include a regulating gate to control the quantum of flow into the canal, for the apparatus to include a centrally located aerator adapted to impart a spiral motion about the aeration chamber centre to the liquid-borne sludge in the aeration chamber and for the aerator to include a stirring mechanism adjacent the floor of the chamber.

A preferred embodiment of the invention is described below by way of example, reference being made to the accompanying schematic drawings, in which:

FIG. 1 is a plan view of an aerating installation according to the invention; and FIGS. 2 and 3 are sectional elevations of parts of the installation taken along lines II—II and III—III respectively in FIG. 1.

The aerating installation comprises a tank 1 having a central aeration chamber 2, circular in plan and a canal 3 extending along the periphery of the aeration chamber.

At one end the canal 3 has an overflow weir 4 from the aeration chamber into the canal. The weir 4 is located beneath the normal liquid-sludge level 5 in the chamber 2 and is so dimensioned as to enable liquid-borne sludge to be diverted into and driven along the canal under the action of a spiral motion about the chamber centre of the sludge in the aeration chamber 2.

This motion in the sludge may be created by an aerator 6 mounted centrally in the aeration chamber and preferably of the conoidal type described in our co-pending Application entitled "Apparatus for Aeration or Evaporation of Liquid." The aerator causes circular and upward motions of sludge in the chamber and these motions combine to give a spiral flow which pushes the sludge along the canal 3. To facilitate this flow, the floor of the chamber 2 is preferably formed as an endless channel 7 of arcuate cross-section. The aerator 6 preferably has a stirring mechanism 21 mounted thereon for rotation adjacent the floor of the chamber 2.

The end of the canal opposite the end with the inlet weir 4 has an underflow weir 8 in the chamber wall for returning to the aeration chamber 2 at least some of the liquid-borne sludge in the canal 3. This weir 8 is situated adjacent the inlet weir 4 and has a deflecting wall 9 of the canal located to co-operate therewith. Adjacent to the deflecting wall 9 and upstream thereof is an outlet from the canal in the form of another overflow weir 10 preferably adjustable in height.

The floor 11 of the canal slopes downwardly from the deflecting wall 9 to the weir 8 to enable sludge to be returned from the canal 3 to the chamber 2 under the action of gravity.

As shown, the deflecting wall 9 is displaced progressively towards the aeration chamber centre over the length of that part of the canal having the inclined floor 11. This is to enhance even distribution of sludge into the aeration chamber.

Of the lightweight and heavy sludge passing along the canal 3 the former will discharge over the outlet weir 10 into a conduit 12 whilst the latter will pass through the underflow weir 8 to the chamber 2. The weir 10 will be so adjusted as to provide an appropriate ratio of sludge returned to and removed from the tank 1.

Means are provided for regulating the quantum of flow into the canal 3 and may conveniently be in the form of a swing gate 14 mounted at the inlet to the canal. A shield 15 is preferably mounted over the inlet weir 4 to prevent turbulence of liquid entering the canal 3. The conduit 12 leads to a second tank 16 which is the same as the tank 1 described above. The outlet from the tank 16 is in the form of an overflow weir 17 which discharges into a conduit 18 leading to a sludge settling installation.

In use, sewage is fed into aeration chamber 2 through conduit 19 after being passed through the usual screens. The sewage is aerated in the aeration chamber 2 together with activated sludge from the sludge settling installation.

During aeration nitrification also takes place but the passage of the sludge along canal 3 is slow and non-turbulent, giving it an opportunity to denitrify.

At the underflow weir 8 at the end of the canal the heavier of the liquid-borne sludge in the canal is returned to the aeration chamber by sliding down the inclined floor 11 of the canal under the action of gravity. In this way the heavier sludge is recirculated and digestion thereof is enhanced by virtue of the sludge being subjected to more aeration than is usual in these installations.

The lighter sludge passes over the weir 10 to the second tank 16 where the process is repeated. It is considered that the microbial life digesting the sludge will be different for the heavier and lighter sludge and by separating these into two tanks overall digestion will be improved. It may be necessary to remove sludge periodically from the bottom of the aeration chamber through a conduit 20 or the like.

It is stressed that the use of the canals 3 in the tanks 1 and 16 allow denitrification to take place so that denitrified sludge is passed to the settling installation. The continuous recirculation of sludge prevents too much sludge being passed to the settling installation and hence prevents overloading of the latter. Also, recirculation increases the sludge concentration in the tanks and hence the bacteria concentration which improves digestion and conversion to gas.

Although a double tank installation has been described, it may in certain applications be expedient to use one only or more than two tanks. Also, the installation described above may be changed in many ways as a matter of design without departing from the spirit of the invention.

What I claim as new and desire to secure by Letters Patent is:

1. In activated sludge treatment of sewage in a chamber having a center, the improvement comprising a) imparting to the sewage in the chamber a spiral motion about the chamber center, b) using the motion imparted to the sewage to cause liquid-born sludge in the chamber to flow from the chamber into and along a canal around the chamber, c) returning at least part of the liquid-born sludge under the influence of gravity directly from the canal back into the chamber after flowing said sludge in the canal substantially around the chamber.

2. A process according to claim 1 wherein the flow of sludge along the canal around the chamber is slow and non-turbulent.

3. A process according to claim 2 which comprises aerating the sewage in the chamber.

4. Apparatus suitable for use in activated sludge treatment of sewage and comprising a tank having a central chamber with a floor and a centre, canal means for slow and non-turbulent flow of sludge around the chamber, an overflow weir from the chamber into the canal means, underflow weir means to permit sludge in the canal means to flow directly from the canal means into the chamber, a deflecting wall in the canal means co-operating with the underflow weir means and an outlet from the canal means adjacent the deflecting wall and upstream thereof.

5. Apparatus as claimed in claim 4 in which the overflow weir and underflow weir means are located adjacent one another.

6. Apparatus as claimed in claim 4 in which the canal means has a floor which slopes downwardly from the deflecting wall to the underflow weir means.

7. Apparatus as claimed in claim 6 in which the deflecting wall is displaced progressively towards the chamber centre over the length of the canal means for which the floor slopes downwardly.

8. Apparatus as claimed in claim 4 in which the outlet is in the form of an overflow weir which is adjustable in height.

9. Apparatus as claimed in claim 4 in which the chamber floor is in the form of an endless channel of arcuate cross-section.

10. Apparatus as claimed in claim 4 including a regulating gate to control the quantum of flow into the canal.

11. Apparatus as claimed in claim 4 including a centrally located aerator adapted to impart a spiral motion about the chamber centre to liquid-borne sludge in the chamber.

12. Apparatus as claimed in claim 11 in which the aerator includes a stirring mechanism adjacent the floor of the chamber.

* * * * *